Dec. 14, 1954    R. B. SQUIRES    2,697,202
ELECTRICAL CONTROL APPARATUS
Filed Aug. 27, 1952
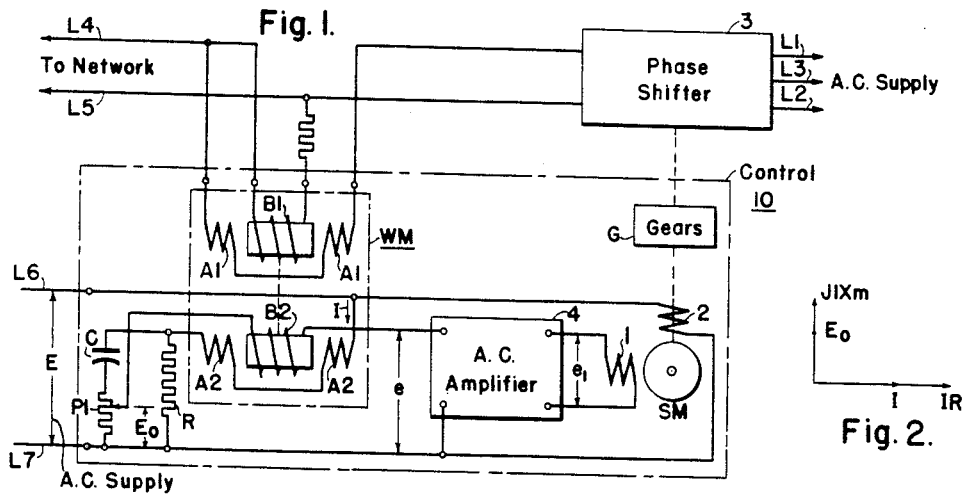
Fig. 1.
Fig. 2.
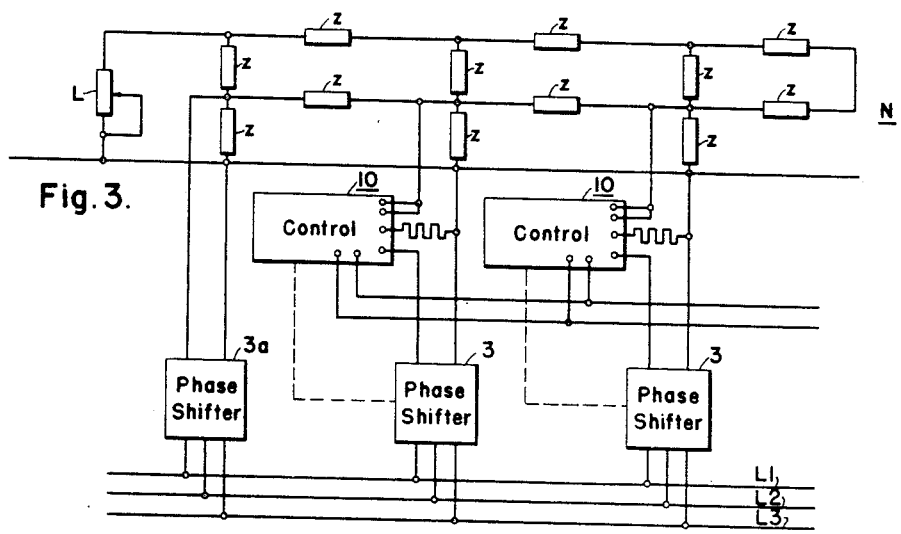
Fig. 3.
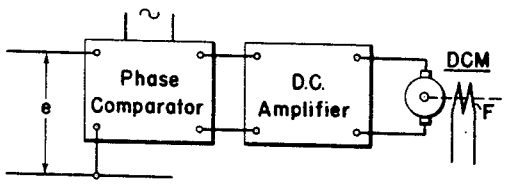
Fig. 4.
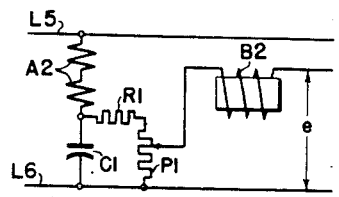
Fig. 5.
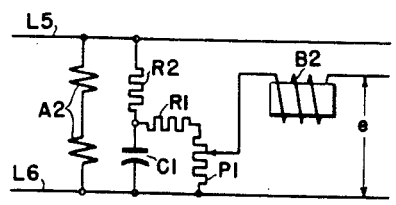
Fig. 6.
WITNESSES:
John E. Healy
E. F. Oberlin
INVENTOR
Rathbun B. Squires.
BY
Paul E. Friedemann
ATTORNEY

United States Patent Office 2,697,202
Patented Dec. 14, 1954

2,697,202

ELECTRICAL CONTROL APPARATUS

Rathbun B. Squires, Pittsburgh, Pa., assignor to Westinghouse Electric Corporation, East Pittsburgh, Pa., a corporation of Pennsylvania Application August 27, 1952, Serial No. 306,660

7 Claims. (Cl. 323—101)

This invention in one of its aspects relates generally to an improvement in network calculators and in another of its aspects to a type of servo system responsive to a condition to be controlled for controlling such condition. More in particular, this invention relates to an electric power or watt regulator and to an alternating current network calculator system involving such a regulator or regulators.

In the study of the behavior of electric power transmission systems or networks, an alternating current network calculator has been devised which embodies various electrical components such as conductors, resistors, capacitors, inductors, transformers, power supply devices, etc., which may be connected together as required by suitable switching facilities to simulate an actual alternating current network which is to be studied. For the purposes of this discussion such simulated network may be referred to as an analogy network since it represents, by suitably connected electrical components having electrical characteristics simulating those of the prototype network but in many instances of different physical form, the actual system to be studied.

Electrical alternating current power transmission systems involve networks fed with electric power from a plurality of points usually by means of separate governor controlled generators. On the actual power system, if several generators operate in parallel, the power difference between them depends on the relative phase angle of the respective generator rotors which in turn depends upon the power output of the respective prime movers driving the generators. If the throttle of one prime mover or machine, such as a turbine, is opened, it produces more torque and the connected generator rotor accelerates momentarily. As the angular position in rotation of that rotor leads the instant angular position of the rotors of the other generators, the electric power loading of the accelerated generator increases to balance the increased mechanical power so that electrical and mechanical power equilibrium in the accelerated generating unit is established at the new rotor angle.

Under this condition, with the power output of one generating unit increasing, the power from other generators connected to the line tends to decrease. This is prevented or minimized in the actual system in some instances by respective load governors on the prime movers, which tend to maintain constant power output at the respective generators. In other instances, the station operator by observation of suitable instruments may adjust the prime mover controls to maintain power.

In the study of such transmission networks the analogy network may be supplied at selected points by respective devices known as generator units but which are essentially variable impedance phase shifter units having an output circuit connected to the network, an input circuit connected to a supply of alternating current and a movable control member which shifts the phase of the alternating current voltage thereacross from the alternating current supply to the network and, hence, affords a means of controlling the electric power supplied to the network.

Such a phase shifter may be a standard inductive device involving a three phase rotor winding and a single phase stator winding. The rotor winding is connected to a supply of three phase alternating current voltage and when shifted angularly shifts the phase of the voltage induced in the stator winding, which latter winding supplies the analogy network. Alternatively, a phase shift circuit on the input of an alternating current amplifier may be used.

These phase shift units, unlike the generators of the actual system which they represent, maintain a constant phase angle when network loading changes while the actual system generators maintain constant power output because of the mentioned governor action.

In the past, the network calculator operator, to make the calculator generator units simulate the operation of the actual system generators, readjusted the phase angles of each calculator generator unit after each change in load to readjust their power outputs. This is necessarily a cut-and-try process, because changing the power output of any one unit changes the output of all the others, not usually in the correct proportion. This readjustment of all units requires considerable time, especially when a large load change is made.

Accordingly, one object of this invention is to provide a network calculator of the class described which is easily operated and accurately simulates the conditions of the actual system being studied.

Further to the preceding object, it is an object of this invention to construct an alternating current network calculator of the type referred to, involving parallel-connected power supplies in which automatic regulation of the respective power supplies is provided.

Another object of this invention is to provide a watt regulator.

Further to the preceding object, it is an object of this invention to provide a watt regulator which is simple with respect to operational requirements and positive in operation.

Yet a further and more specific object of this invention is to provide a watt regulator using a two-element wattmeter movement as the watt measuring and watt error quantity producing means of the regulator.

The foregoing statements are merely illustrative of the various aims and objects of this invention. Other objects and advantages will become apparent upon a study of the following specification when considered in conjunction with the accompanying drawing in which:

Fig. 1 is a schematic diagram illustrating a watt regulator circuit embodying the principles of this invention;

Fig. 2 is a vector diagram showing the relationship of the currents and voltages in certain portions of the wattmeter system;

Fig. 3 is a diagrammatic illustration of an analogy network for a network calculator embodying the subject matter of Fig. 1 in block form;

Fig. 4 illustrates a modification in the manner of utilizing the error quantity to control a motor; and Figs. 5 and 6 respectively show variations in the manner in which one element of the two-element wattmeter may be connected.

In Fig. 1 the watt regulator system for a single network calculator supply circuit is illustrated. In this illustration, the generator unit of the actual system is represented by means of a phase shifter, illustrated only in block form and designated 3, having an input circuit connected to alternating current supply conductors L1, L2 and L3 and an output circuit connected to conductors L4 and L5 which are adapted for connection to a network calculator circuit representing the power transmission circuit of the actual power system. As described hereinbefore, the phase shifter unit (not detailed in the interest of simplicity) while representing the generator of the actual system does not inherently possess characteristics corresponding to the governor controlled prime mover and generator combination of the actual system, which latter by governor control of the prime mover tends to maintain an essentially constant power output with load changes on the system. Accordingly, provision is herein made to automatically control the phase shifter in dependence of variation of output power from a given value to effectively maintain the output power at a substantially constant level.

The watt measuring and watt error detecting means embodies a two-element wattmeter designated WM. The first element of this wattmeter comprises a stationary coil system designated A1 and a moving coil system designated B1 which is inductively coupled to the stationary coils and pivotally mounted for movement against the bias of a restraining spring (not shown) due to the action of the interlinking magnetic fields of the respective coil systems. In this illustration, the current coils A1, which are stationary, are connected in series in conductor L4 and the moving coil is connected across the output circuit represented in conductors L4 and L5. This element of the wattmeter functions as a conventional wattmeter wherein the coil B1 assumes an angular position with respect to a fixed reference in the instrument which is indicative of the power of the output circuit of phase shifter.

The second element of the wattmeter involves a stationary coil system designated A2 and a moving coil system designated B2. This moving coil is mechanically connected to the moving coil B1 of the first wattmeter element to be moved thereby in accordance with the electric power of the output circuit of phase shifter 3. The stationary coils A2 of the second wattmeter element are connected across an alternating current supply circuit represented in conductors L5 and L6. The stationary and moving coils of the second wattmeter element as was the case in the first element are also inductively coupled and therefore, the magnetic field of stationary coil A2 induces a voltage in moving coil B2 depending upon the angular position of the axis of the moving coil with respect to the magnetic field produced by stationary coil A2. The induced voltage in coil B2 being a function of the angular position of this coil in the magnetic field of coil A2 and being positioned angularly in dependence of the power of the output circuit of phase shifter 3 is therefore an indication of the power in the aforesaid output circuit. The actual current flow through stationary coils A2 of the second element of the wattmeter may be controlled as required by means of a resistor R which in this instance is shown as a fixed resistor. By comparing the induced voltage in coil B2 with a fixed reference voltage which represents the desired magnitude of electric power in the phase shifter output circuit for which the system is to regulate, it is possible to obtain an error quantity which may be utilized in controlling the phase shifter.

In this illustration, this is accomplished by deriving a voltage from resistor R which is shifted in phase so that it is in phase with the induced voltage in coil B2 and combining this voltage in series opposition with the aforesaid induced voltage to obtain an error voltage. The specific means for accomplishing this is represented in a potentiometer P1 connected in series with a capacitor C across the resistor R. A tap on potentiometer P1 is connected in series with coil B2 and this circuit is completed in the input circuit of an alternating current amplifier designated 4, having as a common return path the conductor L7. The voltage of P1 is shifted by capacitor C so that it is in phase with the voltage of coil B2. The value of capacitor C is preferably large compared with the values of resistor R and potentiometer P1 so that the circuit impedance is primarily characterized by capacitive reactance to obtain the various voltage and current relationships shown in the vector diagram of Fig. 2. Resistor R is of a value to assure a current which is in phase with the line voltage. Thus if the output of phase shifter 3 is at the power level indicated by the tapped voltage $E_0$, at potentiometer P1 the induced voltage of coil B2 will be equal and opposite to the tapped voltage $E_0$. Hence the error voltage $e$ appearing across the input circuit of the alternating current amplifier 4 will be zero. If the output power of phase shifter 3 is higher than that indicated by the tapped voltage $E_0$, a differential voltage of a phase corresponding to the phase of the induced voltage will appear in the input circuit of the amplifier and if the power in the output circuit of phase shifter 3 is lower than that indicated by tapped voltage $E_0$, the tapped voltage $E_0$ will predominate. The error voltage in this instance will be of a magnitude depending on the differential of the tapped and induced voltages and will be of a phase corresponding to that of the tapped voltage. With this arrangement phase reversal of the error voltage is obtained depending upon which of the tapped or induced voltages predominate, the magnitude in each case being proportional to the difference in magnitudes of the aforesaid voltages. The circuit arrangement is such that variations in the supply voltage E do not affect the balance point because the induced voltage $JIXm$ and the voltage $E_0$ across P1 (proportional to IR) are changed by equal percentages. Likewise, changes in the resistance of coil A2 have no effect because both voltages are proportional to the current I through coil A2.

The means for moving the moving element of the phase shifter in this instance is represented in a two-phase servo motor designated SM. The rotor of such a motor is usually connected to an output shaft through a suitable gear reduction system, in this instance designated G, and forming a part of the mechanical connection between the rotor and the movable element of the phase shifter. The two phase motor SM is equipped with two field windings designated 1 and 2 respectively, disposed in space quadrature. If the excitation voltages applied to these fields are in time quadrature magnetic fields are produced in the motor which are in quadrature and, hence, produce torque for rotating the motor. One of these fields, namely the field winding 2, is connected across the alternating current supply L6 and L7 to be excited with a constant alternating current voltage. The other field winding designated 1 is connected to the output circuit of amplifier 4 which due to the described reversal in phase of error voltage $e$ in the input circuit of the amplifier is excited with an amplified output voltage which is reversible in phase with respect to that exciting the field winding 2, imparting a directivity sense in the control of the servomotor. This directivity sense is such that the phase shifter is operated in a direction to maintain a substantially constant power level in the phase shifter output circuit.

The output voltage $e_1$ of the amplifier 4 is in quadrature with the line voltage E since it is in phase with error voltage $e$ which, in turn is either in phase or 180° out of phase with the potentiometer voltage $E_0$ which latter voltage is in quadrature with the line voltage as described. Hence, the voltages applied to fields 1 and 2 are in time quadrature to produce torque and the voltage $e_1$ being reversible controls the direction of motor rotation.

In the system illustrated in Fig. 3, the control enclosed within the dot-dash block designated 10 in Fig. 1 is illustrated in block form and also designated 10. This illustration depicts a typical calculator network N which is the electrical analogy of an actual power system. The network being supplied is represented in a plurality of impedances Z connected to simulate the actual network and to which the output circuits of the respective phase shifters illustrated are connected as dictated by the analogy. These impedances may be resistors, inductors, capacitors, etc. The input circuits of these phases shifters are connected in parallel to a three phase alternating current supply represented in conductors L1, L2 and L3. All of these phase shifters in Fig. 3, with the exception of that designated 3a and appearing on the left, are equipped with watt regulators which, as described in connection with Fig. 1, maintain the electric power level of the output circuit of the phase shifters at a substantially constant level. Thus with the network shown, if the load L in the network is varied the total network power may increase. All phase shifters equipped with controls 10 maintain essentially the same power output, so that the increased power must be furnished by the phase shifter 3a. This unit, controlled by the calculator operator therefore represents the unit or units assigned to maintain frequency on the actual power system.

In Fig. 1 the servomotor is a two-phase induction motor. The principles of this invention may also be practiced in a control terminating in a direct current motor such as illustrated in Fig. 4. This showing is a fragmentary portion of the circuit of Fig. 1, illustrating only that part of the system which has been changed. Thus, the error voltage $e$ shown in Fig. 4 is derived in the same manner and corresponds exactly to that illustrated in Fig. 1. In Fig. 4 the error voltage is applied to a phase comparator in which the phase of the error voltage is compared with the phase of a reference supply of alternating current such as L6 and L7 of Fig. 7. The output of this phase comparator circuit is direct current which reverses in polarity depending upon whether or not the error voltage is in phase or 180° out of phase with the reference voltage of the phase comparator. The output circuit of the phase comparator is connected to the input circuit of a direct current amplifier the output of which is applied across the armature terminals of a direct current motor designated DCM having a field winding F adapted for excitation from a suitable supply of direct current. Since the polarity of excitation of this field winding is fixed and the armature terminal voltage reverses with reversals in phase of the error voltage with respect to the phase comparator reference voltage, the direction of rotation of motor DCM will be determined by the polarity of the armature terminal voltage. This motor may be connected in exactly the same way as shown in Fig. 1 to drive the movable element of the phase shifter. Both the phase comparator and the D. C. amplifier in Fig. 4 are illustrated in block form because these elements are conventional in nature and well known to any engineer skilled in the art and these units per se form no part of the present invention.

The simple variable voltage drive of Fig. 4 may be increased in capacity by utilizing a conventional variable voltage motor and generator system in which the generator terminal voltage is applied to the armature terminals of the motor. In such a case the output of the D. C. amplifier would control a suitable field winding system on the generator. Again in this case the motor may have a field winding excited from a constant source of direct current.

Fig. 5 diagrammatically illustrates a different way for obtaining a phase shifted reference voltage $E_0$. To simplify this illustration the schematic representation of the relationship of the current coils A2 and the voltage coil B2 of the second element of the wattmeter, as seen in Fig. 1, has been replaced with a diagrammatic showing of these respective elements. In this instance the stationary coil system A2 is connected in series with a capacitor C1 across the alternating current supply conductors L5 and L6. Potentiometer P1 is now connected in series with a resistor R1 across the capacitor C1. Since the voltage across the capacitor lags the current by 90°, it will be appreciated that the voltage appearing across the potentiometer P1 will be shifted in phase correspondingly and, hence, by this means shifted to a phase position corresponding to that of the induced voltage in moving coil B2. As previously noted but stated differently, resistor R1 and potentiometer P1 have respective values much greater than $$\frac{1}{WC1}$$

so that they do not affect the described 90° relationship.

In Fig. 6 the stationary coils A2 are connected in series across the supply conductors L5 and L6. The capacitor C1 is now connected in series with a resistor R2 across the supply conductors. The function of this circuit will be understood in connection with the explanations made with regard to Fig. 5.

The foregoing disclosure and the showings made in the drawing are merely illustrative of the principles of this invention and are not to be construed in a limiting sense.

I claim as my invention:

1. Apparatus for regulating the electric power supplied to an alternating current circuit comprising, an electric power controller having a movable adjusting member, a two-element wattmeter device, each element having a current winding and a rotatable voltage winding inductively coupled to said current winding, means mechanically connecting said voltage windings together, the current and voltage windings of one of said two elements being adapted for connection in said circuit to be energized in dependence of the voltage and current thereof, circuit connections for applying alternating current to the current winding of the second of said two elements, whereby a voltage is induced in the voltage winding of said second element, electrical means for producing a reference alternating current voltage, circuit means connecting said electrical means and said last-named voltage winding in series opposition and motor means responsive to the differential of said induced voltage and said reference voltage for controlling said movable adjusting member of said power controller.

2. Apparatus as set forth in claim 1 in which said motor means comprises a two-phase motor having a pair of field windings, circuit connections for applying alternating current to one field winding, and an alternating current amplifier having an input circuit connected to said circuit means to respond to the differential voltage thereof and an output circuit connected to the other of said pair of field windings.

3. Apparatus as set forth in claim 1 in which said motor means comprises a direct current motor, a direct current amplifier having an output circuit connected to said motor and an input circuit, a phase comparator connected to said circuit means to be energized in dependence of said differential voltage and producing a direct current output voltage having a magnitude depending upon the said differential voltage and having a polarity depending upon the phase relation of said differential to a reference voltage, and circuit means connecting said direct current voltage to the input circuit of said amplifier.

4. Apparatus for controlling the electric power in an alternating current circuit comprising, a variable impedance device adapted for connection in said alternating current circuit and having a movable impedance varying member, a two-element wattmeter, each element including a current coil and a pivotally mounted voltage coil, means mechanically connecting the pivotally mounted voltage coils for movement together, the current and voltage coils of the respective elements being inductively coupled, energization of the respective coils of each element producing a torque on the pivotally mounted voltage coil, the current coil and voltage coil of one element being adapted for connection in said alternating current circuit to be energized in depedence of the current and voltage thereof respectively, circuit connections for applying alternating current to the current coil of the second element, circuit means connected in series with said voltage coil of said second element for producing a reference voltage in phase opposition to the voltage induced in said latter voltage coil, and motor means responsive to the differential voltage resulting from said opposed reference and induced voltages for operating said movable impedance varying member.

5. A network calculator for simulating an actual electric power supply network having a plurality of parallel-connected generators supplying the actual network comprising, an alternating current circuit representing the actual network, a plurality of variable impedance devices each having an output circuit connected to the alternating current circuit and each having an input circuit adapted for connection to a supply of alternating current, each variable impedance device having a movable member for varying the impedance thereof, a plurality of electric power detecting devices, one for each variable impedance device, each electric power detecting device comprising a two element wattmeter, each element comprising a current coil and a movable voltage coil, circuit means connecting the current and voltage coils of one element of the respective wattmeters to the respective output circuits of said variable impedance devices, means for applying substantially constant voltages and currents to the voltage and current coils of the remaining element of each wattmeter, respective motor means for each variable impedance device controlling the respective movable members of the variable impedance devices, and means connecting the respective voltage coils of said remaining elements of said wattmeters to said respective motor means for controlling said respective motor means.

6. A network calculator for simulating an actual power supply network having a plurality of parallel-connected generators supplying the actual network comprising, an analogy network representing the actual network, a plurality of variable impedance devices each having an output circuit connected to the analogy network and each having an input circuit adapted for connection to a supply of alternating current, each variable impedance device having a movable impedance varying member, a plurality of electric power detecting devices, one for each variable impedance device, each electric power detecting device comprising a two element wattmeter, each element comprising a current coil and a movable voltage coil, circuit means connecting the current and voltage coils of one element of the respective wattmeters to the respective output circuits of said variable impedance devices, means for applying substantially constant voltages and currents to the voltage and current coils of the remaining element of each wattmeter, and respective servo means connected to the respective voltage coils of the remaining elements of each wattmeter for moving the respective movable impedance varying members.

7. A network calculator for simulating an actual power supply network having a plurality of parallel-connected generators supplying the actual network comprising, an analogy network representing the actual network, a plurality of variable impedance devices each having an output circuit connected to the analogy network and each having an input circuit adapted for connection to a supply of alternating current, each variable impedance device having a movable impedance varying member, respective first wattmeter elements connected to the respective output circuits to respond to the electric power thereof and having a moving coil the angular position of which indicates power, respective second wattmeter elements, each having a stationary and a moving coil which are inductively coupled, means mechanically connecting the moving coils of the respective first and second wattmeter elements, circuit connections for applying alternating current to said respective stationary coils which induces a voltage in the respective moving coils of the second elements, respective circuit means including respective reference voltages connected in series opposition with the respective moving coils of the second elements, and respective motor means responsive to the difference of the respective reference and induced voltages for controlling the respective movable impedance varying members.

References Cited in the file of this patent

UNITED STATES PATENTS

| Number | Name | Date |
|---|---|---|
| 746,697 | Hallberg | Dec. 15, 1903 |
| 2,525,488 | Jolly | Oct. 10, 1950 |
| 2,564,682 | Fisk et al. | Aug. 21, 1951 |